US008251417B2

(12) United States Patent
Mills

(10) Patent No.: US 8,251,417 B2
(45) Date of Patent: Aug. 28, 2012

(54) DETECTION FRAME FOR A LIFTING DEVICE

(75) Inventor: Robert Arthur Mills, Chorley (GB)

(73) Assignee: NSL Engineering Pte Ltd., Singapore (SG)

( * ) Notice: Subject to any disclaimer, the term of this patent is extended or adjusted under 35 U.S.C. 154(b) by 355 days.

(21) Appl. No.: 12/306,951

(22) PCT Filed: Jul. 2, 2007

(86) PCT No.: PCT/SG2007/000196

§ 371 (c)(1),
(2), (4) Date: Dec. 30, 2008

(87) PCT Pub. No.: WO2008/004985

PCT Pub. Date: Jan. 10, 2008

(65) Prior Publication Data

US 2009/0278368 A1 Nov. 12, 2009

(30) Foreign Application Priority Data

Jul. 5, 2006 (SG) ................................ 200604460-6

(51) Int. Cl.
*G01F 23/00* (2006.01)
*B66C 1/62* (2006.01)

(52) U.S. Cl. .................... 294/81.1; 294/81.21; 294/907; 250/358.1

(58) Field of Classification Search ................. 294/81.1, 294/81.2, 81.21, 81.53, 907; 378/57; 250/358.1
See application file for complete search history.

(56) References Cited

U.S. PATENT DOCUMENTS

| | | | | |
|---|---|---|---|---|
| 3,747,970 | A * | 7/1973 | Fathauer et al. | 294/81.1 |
| 5,183,305 | A * | 2/1993 | Nordstrom et al. | 294/81.2 |
| 6,768,421 | B1 | 7/2004 | Alioto et al. | |
| 6,936,820 | B2 * | 8/2005 | Peoples | 250/336.1 |
| 7,267,239 | B2 * | 9/2007 | Takehara et al. | 212/270 |
| 7,531,806 | B2 * | 5/2009 | Song | 250/358.1 |
| 7,665,784 | B2 * | 2/2010 | Stinis | 294/81.21 |
| 2003/0201394 | A1 | 10/2003 | Peoples | |

FOREIGN PATENT DOCUMENTS

WO WO 2004/111683 A2 12/2004

OTHER PUBLICATIONS

International Preliminary Report on Patentability (IPRP) (date of issuance Jan. 5, 2009) and Written Opinion of the International Searching Authority (date of mailing Nov. 29, 2007) for PCT/SG2007/000196.

* cited by examiner

*Primary Examiner* — Dean Kramer
(74) *Attorney, Agent, or Firm* — Alston & Bird LLP

(57) ABSTRACT

A detection frame for a lifting device is provided. The frame supports a detection system whilst the frame is attached to a lifting device, the lifting device used for lifting freight, the frame comprising attachment brackets for attaching the frame to the lifting device; at least one platform for mounting the detection system to the frame, such that the frame is in spaced relation to the freight whilst mounted to the lifting device.

16 Claims, 6 Drawing Sheets

DETECTION FRAME FOR A LIFTING DEVICE

CROSS REFERENCE TO RELATED APPLICATIONS

This application is a 35 U.S.C. 371 national phase application of International Application No. PCT/SG2007/000196, filed Jul. 2, 2007, which International Application was published by the International Bureau in English on Jan. 10, 2008, and claims priority to SG 200604460-6, filed Jul. 5, 2006, both of which are incorporated herein by reference in their entirety.

FIELD OF INVENTION

The invention relates to apparatus for lifting freight, and more particularly, to a detection systems used with said lifting devices for detecting anomalies within said freight. An example of said lifting devices includes, but is not limited to, spreaders for engaging shipping containers, with an example of a detection system including apparatus for detecting the presence of fissile or radioactive material.

BACKGROUND

A system to detect fissile material within a container is disclosed in U.S. Pat. No. 6,768,421, the contents of which are incorporated herein by reference. Here, a spreader has been adapted to include detection apparatus for detecting radioactive material or potentially radioactive shielding material within the container.

This type of arrangement has several drawbacks. Firstly, to maintain control of the spreader, and still operate as quickly as possible, spreaders can be complex devices. This complexity suggests a conflict of purpose, whereby the ideal location for the detection equipment will be compromised. Alternatively, such a spreader will need to be substantially modified in order to accommodate the detection system, leading to costly redesign. Secondly, maintenance of the detection equipment will lead to downtime of the spreader. Whilst it would be preferable to investigate every container, it is still necessary to maintain the flow rate of containers through a port. It follows that downtime of a spreader can lead to a significant delay and consequent financial loss whilst the spreader is unavailable, not for any in the spreader, but due to a fault with the detection system.

An alternative arrangement is shown in U.S. Pat. No. 6,998,617, the contents of which are incorporated herein by reference. Here the detection equipment is mounted to a frame which is placed intermediate the spreader and the container. To ensure a correct alignment position of the detection equipment, the frame is mounted to the container using twist-locks on bottom legs of each corner of the frame, with the spreader mounted to these legs in an upper portion, again, using twist-locks. Thus the spreader is indirectly mounted to the container through the intermediate detection frame.

The length of the connection between a spreader and an engaged container is factored into the design of the spreader so as to avoid damage to the spreader and container should an unforeseen force be applied. The use of an intermediate frame between the spreader and container will increase this length, and consequently increase the lever arm associated with this connection, by up to factor of 2.

By doubling the length, the applied moment will also double, increasing the chance of damaging the twist-lock connection. Further, the "flipper" at each corner of the spreader, which is designed to apply a specified load in order to locate the spreader onto the container, relies upon the lever arm between the point of rotation and the engagement corner of the container. By doubling the connection length, the lever arm is also doubled and therefore halving the applied force of the flipper used to locate the spreader upon the container, thus reducing the effectiveness of the flipper.

In any event, in order to use a flipper upon a container with the intermediate detection frame in place requires a modification of the spreader to use a longer flipper. This returns, of course, to the original problem of having to modify the spreader, albeit only cosmetically. Further, a spreader having modified flippers cannot easily be used upon a container without the intermediate frame being present.

SUMMARY OF INVENTION

It is an object of the present invention to provide a means of supporting detection apparatus minimizing the problems of the prior art.

In a first aspect, the invention provides a frame for supporting a detection system whilst said frame is attached to a lifting frame, said lifting device used for lifting freight, the frame comprising attachment brackets for attaching the frame to the lifting device and at least one mounting bracket for mounting the detection system to the frame, such that the frame is in spaced relation to the freight whilst mounted to the lifting device.

The arrangement of the invention provides several benefits. As the frame is not in contact with the freight, it therefore does not require a coupling arrangement that may raise the height of the spreader/frame assembly. Therefore, flippers used for standard spreaders may be used without modification, leading to better performance of the flipper and a reduced lever arm of the twist lock engagement compared with the prior art.

In a preferred embodiment, the frame may be releasably mounted to the lifting device, so that the frame can be removed or replaced. This allows either the lifting device or the detection system to undergo maintenance without affecting the other component.

In a preferred embodiment, the frame may be adapted to fit wholly within a void defined by the lifting device and the freight. In some cases, the lifting device and freight may define a void, with the lifting device forming an upper boundary and the freight defining a lower boundary. In this embodiment, the frame may fit wholly within this void so as not to project outside the void and potentially interfere with extraneous objects.

In a more preferred embodiment, the points of connection between the lifting device and freight may include columns or stanchions attaching between corners of the lifting device and corners of the freight, and so, together with the lifting device and freight define a "cage" arrangement. Such an example may include a spreader lifting a shipping container, with the twist lock portions projecting from the spreader to corners of the shipping container. In this preferred embodiment, the frame may not only be wholly within the void, but may also be wholly within the "cage" defined by the corner twist lock arrangements.

In a preferred embodiment, the frame may also include a plurality of support brackets in spaced relation longitudinally along said frame. These support brackets may provide means to attach the frame to the lifting device, and so support the length of the frame from the lifting device. Such support brackets may include simple points of attachment, or extend to actual hangers which are adapted to bolt, weld or otherwise engage the lifting device so as to provide the requisite support.

In a preferred embodiment, the frame may be attached to the lifting device, with the attachment brackets including connectability to hangers or other support members such that frame is suspended from the lifting device. Alternatively, the frame may be attached to vertically extending portions of the lifting device, with the attachment brackets located at extreme ends of the frame.

In a more preferred embodiment, the frame may be mounted adjacent extreme opposed ends of lifting device. Thus, so as to fully span the length of the lifting device, it may be advantageous for the attachment brackets to attach to extreme ends of the lifting device, whether the attachment is through vertically extending members of the lifting device or through an arrangement of hangers so as to suspend the frame.

In some instances, the frame may need to be attached to a lifting device which is adapted to lift freight of variable size, or multiple versions. One such example is disclosed in WO2001/062657, the contents of which are incorporated herein by reference. Disclosed is a spreader for lifting multiple containers, end to end. The spreader in this case is longitudinally extendable for lifting two 20 foot containers, or a single 40 foot container, or contract so as to be used with a single 20 foot container. A frame according to one embodiment of the invention may be longitudinally adjustable to also accommodate this extension or contraction. In a more preferred embodiment, the frame may be selectively extendable or contractible, such that the frame automatically follows the extension/contraction of the lifting device to which it is attached.

An alternative arrangement is disclosed in WO 2005/090223, the contents of which are incorporated herein by reference. Here is disclosed a lifting device, in this case a thin spreader assembly whereby the spreaders are laterally separable so as to accommodate a single or double container, side by side. In a preferred embodiment, the frame may also be laterally extendable so as to accommodate the lateral extension/contraction of the lifting device to which it is attached.

In a preferred embodiment, the frame may comprise two or more parallel arms connected through at least one lateral connection member. The lateral connection member may be a platform which may further serve to support detection equipment. In a further embodiment there may be a plurality of lateral connection members divided into categories of simple members to connect the parallel arms to platforms or purpose built members for supporting aspects of the detection system.

In a further preferred embodiment, the arms may include means for extending said arms so as to accommodate the aforementioned extendability of the frame. For instance in one embodiment, the arms may be telescopic, i.e. having one or more segments nested within a fixed arm. Alternatively the arms may include one or more extending arm portions placed parallel to a fixed portion. To extend the frame the moving portions may slide along one face of the fixed arm.

In a further embodiment the arms may be constructed from open channel sections or other open sections. Further, the arms may have the open sections facing upwards. This may provide a further advantage in accommodating cabling or other components of the detection system.

The various means of constructing the frame and also the means for attaching it to the lifting device will be a matter of routine for the skilled addressee and may include any one or a combination of a bolted connections, welded connections, shear pins etc.

In a second aspect the invention provides a freight detection assembly comprising a lifting device for engaging and lifting freight, a frame for supporting a detection system, said frame attached to the lifting device so as to be in space relation from the freight.

BRIEF DESCRIPTION OF DRAWINGS

It will be convenient to further describe the present invention with respect to the accompanying drawings that illustrate possible arrangements of the invention. Other arrangements of the invention are possible and consequently the particularity of the accompanying drawings is not to be understood as superseding the generality of the preceding description of the invention.

DESCRIPTION OF PREFERRED EMBODIMENT

Figure 1:
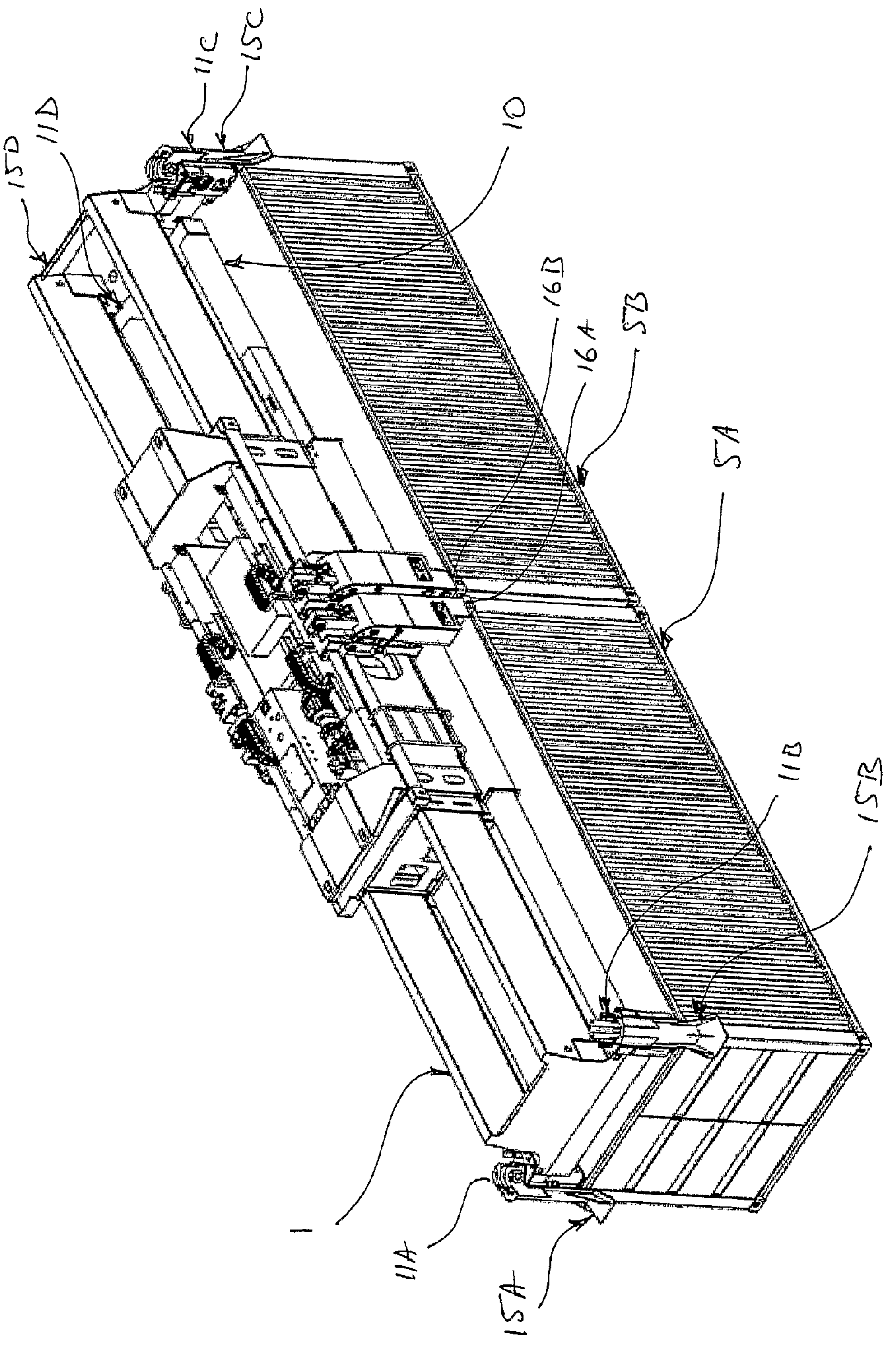
FIG. 1 is an isometric view of a lifting device mounted to a shipping container and having a frame according to one embodiment of the present invention.

FIG. 1 shows a spreader 1 engaged with a pair of containers 5A and 5B placed end to end. The spreader 1 engages the containers 5A and 5B at extreme corners 11A to D and internally at the internal corners of the containers 5A and 5B, each through twist-lock engagements. It will be appreciated that the following description is equally applicable to spreaders having engagement with single containers, and in fact, applicable to other types of freight lifting devices.

Figure 2:
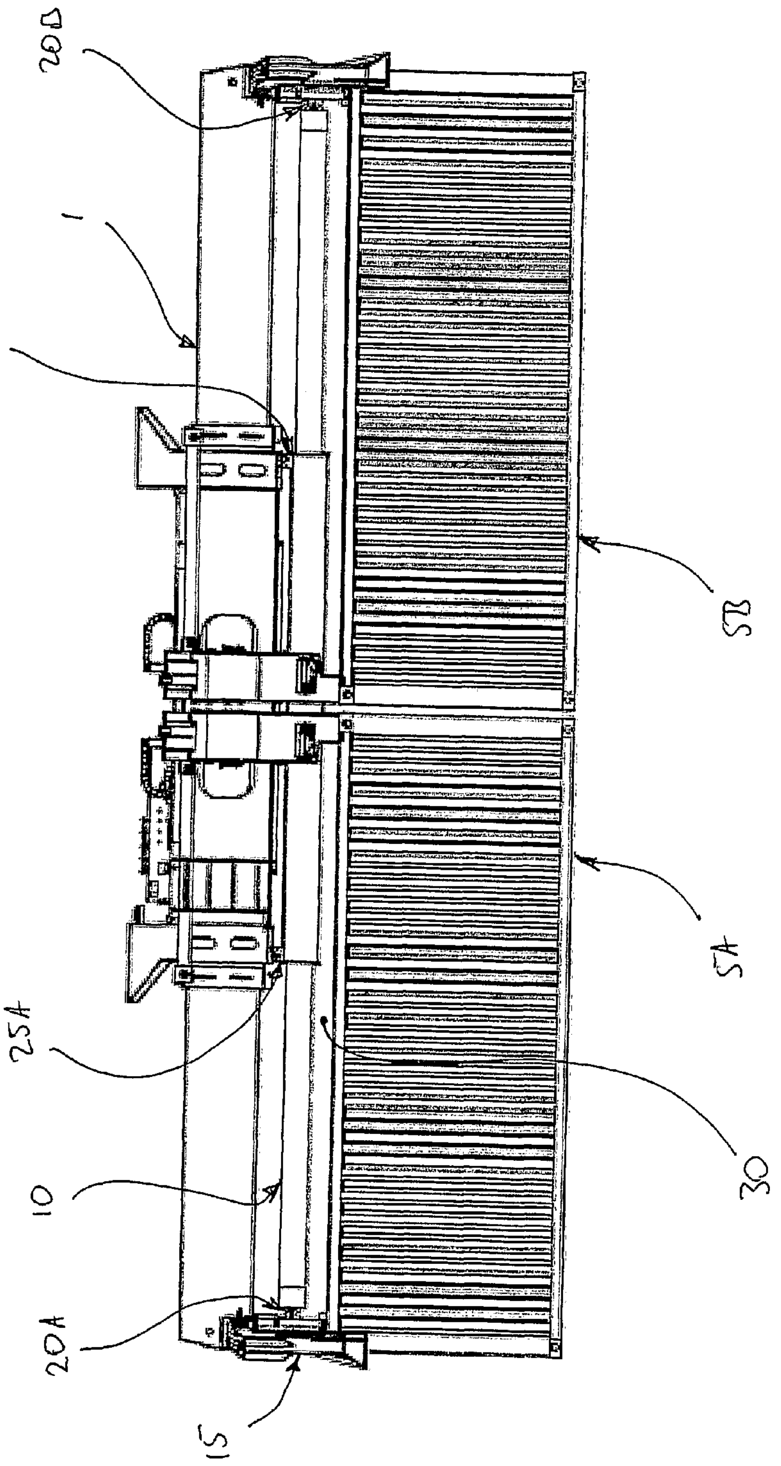
FIG. 2 is an elevation view of the lifting device mounted to a shipping container as shown in FIG. 1.

Mounted to the spreader 1 is a frame 10. As shown in FIG. 2, the frame 10 is mounted within a void 30 defined by a "cage" formed from the spreader 1 above, containers 5A and 5B below, and the twist-lock engagements 15A to D and 16A and B. Thus the frame 10 lies wholly within the void in spaced relation from the containers 5A and 513 so as, firstly, not to interfere with any extraneous object and further to not interfere with the connection between the spreader 1 and the containers 5A and 5B. Thus it will be seen that because the frame 10 is placed in position so as not to interfere with the connection between spreader 1 and containers 5A and 5B, the flippers 15 at each corner of the spreader can be of a conventional type and not overly elongate to accommodate the inclusion of an intermediate frame.

The frame 10 is therefore mounted to the spreader at extreme ends 20A and 20B and is further supported at intermediate points 25A and 25B so as to support the weight of frame. This has both a structural and serviceability benefit in case the weight of the frame 10, and any load it may be carrying, do not lead to an excessive deflection of the frame along its length.

Figure 3:
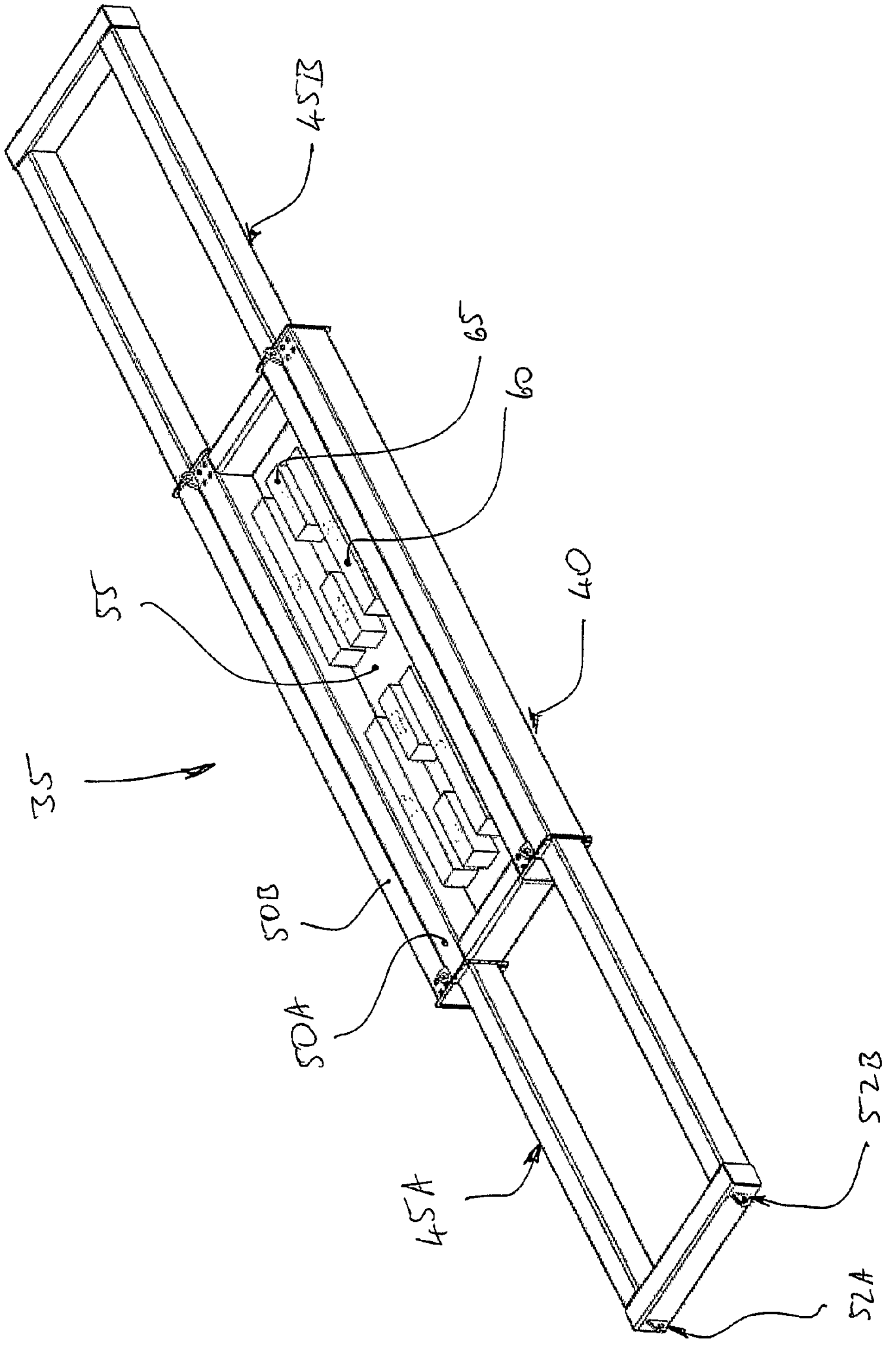
FIG. 3 is an isometric view of a frame according to a second embodiment of the present invention.
Figure 4:
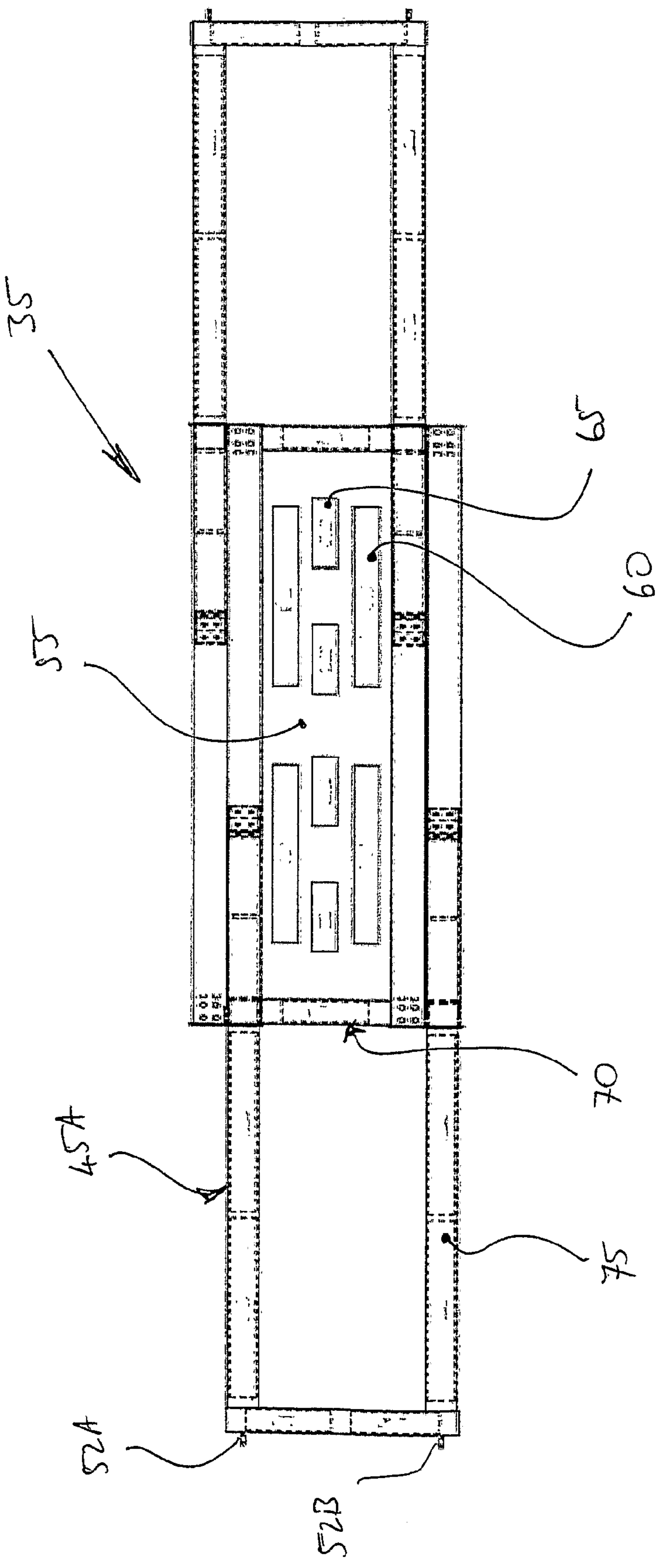
FIG. 4 is a plan view of the frame shown in FIG. 3.

FIGS. 3 and 4 show details of one embodiment of the frame 35. Here the frame is constructed from extendable arms 45A and 45B in telescopic engagement with a central portion 40 such that the frame is selectively extendable through extending arms 45A and 45B to accommodate the length of the spreader to which the frame 35 is mounted. The frame itself, in this embodiment, is releasably engagable with the frame with brackets 52A and B which may be a bolted connection or through use of a shear pin whereby to disengage the frame 35 from a spreader 1 one merely requires withdrawal of the shear pin so as to replace the frame or, in any event, reduce the downtime of the spreader 1 should maintenance to the frame be required.

Leading now to the intent of the frame, it can be seen within platform 55 placement of detection apparatus 60 and 65. In this embodiment, two types of detection units are present, however the invention is not limited to the use of merely two types, but can encompass a variety of different detectors according to the requirements of the user. The pattern of placement of these units 60 and 65 will be in accordance with the requirements for detecting radiation which may be emanating from the containers 5A and B over which the frame is mounted. Detail as to the means for detecting the radiation is disclosed in U.S. Pat. No. 6,768,421, and in combination with this disclosure the skilled addressee will appreciate the need and appropriateness for the correct placement of the detection units 60, 65. This placement can be seen in more detail in FIG. 4, where the members 45A and B may further contain detection unit 70 and 75 internally such that within the frame a considerable number of detection units may be placed within a desired pattern. It will be appreciated that using open channel sections may be beneficial, in that access to the detection units may be more easily achieved, as compared to the closed section members of this embodiment.

It will further be appreciated that, for the system according to the prior art, the detection units were placed within the spreader, which offered a very limited and restrictive arrangement. The present invention, in addition to the other advantages offered, also offers greater flexibility in distribution. The skilled addressee will appreciate a number of different orientations of the frame in order to achieve a wide and diverse range of detection unit distributions, all of which will fall within the scope of the present invention, and all of which will provide unique benefits not offered by the prior art.

Thus, in this embodiment the selective elongation of the frame 35 provides a wide range of flexibility of the frame which at minimal impact on the functioning of the spreaders and containers.

Figure 5:
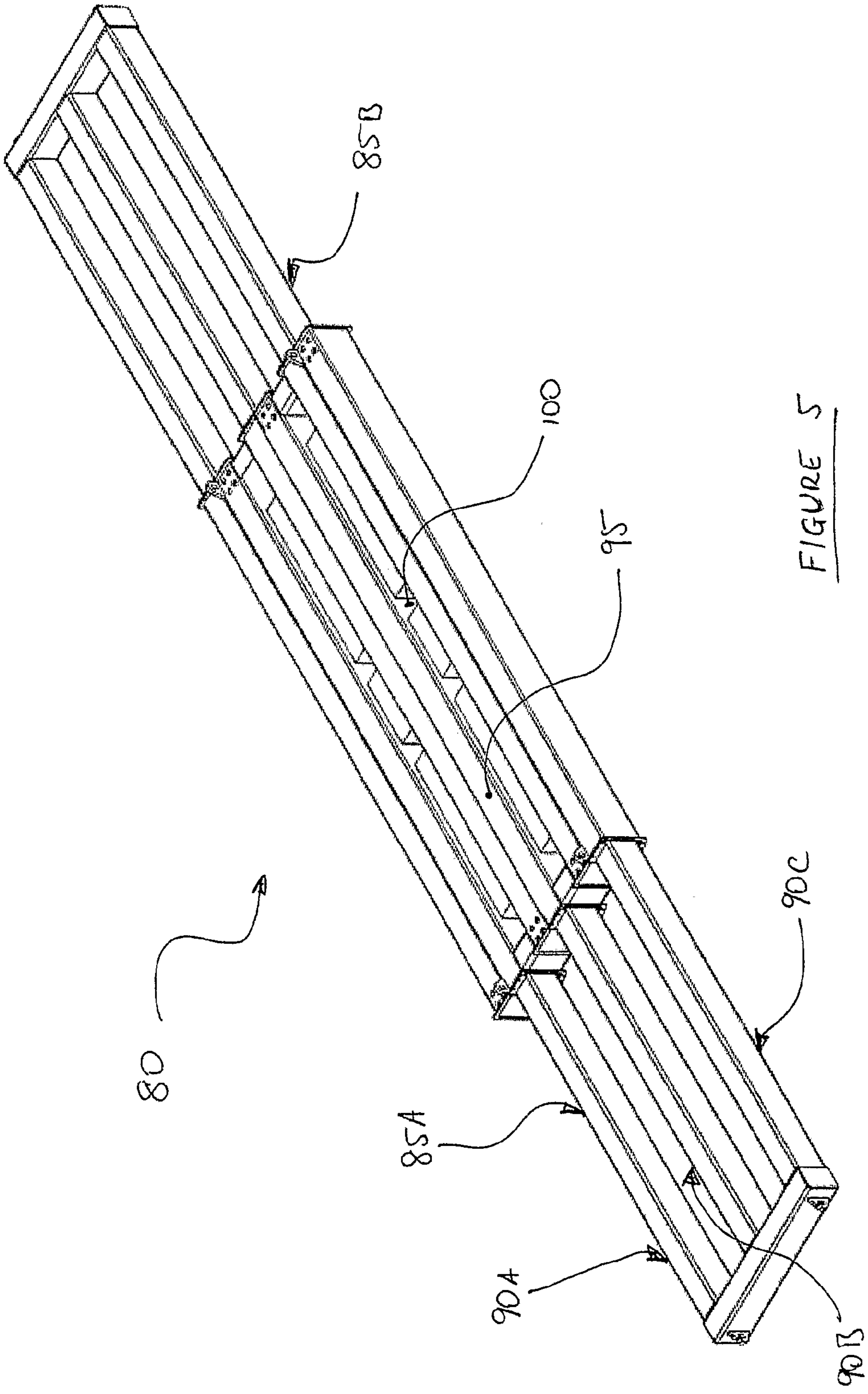
FIG. 5 is an isometric view of a frame according to a third embodiment of the present invention.
Figure 6:
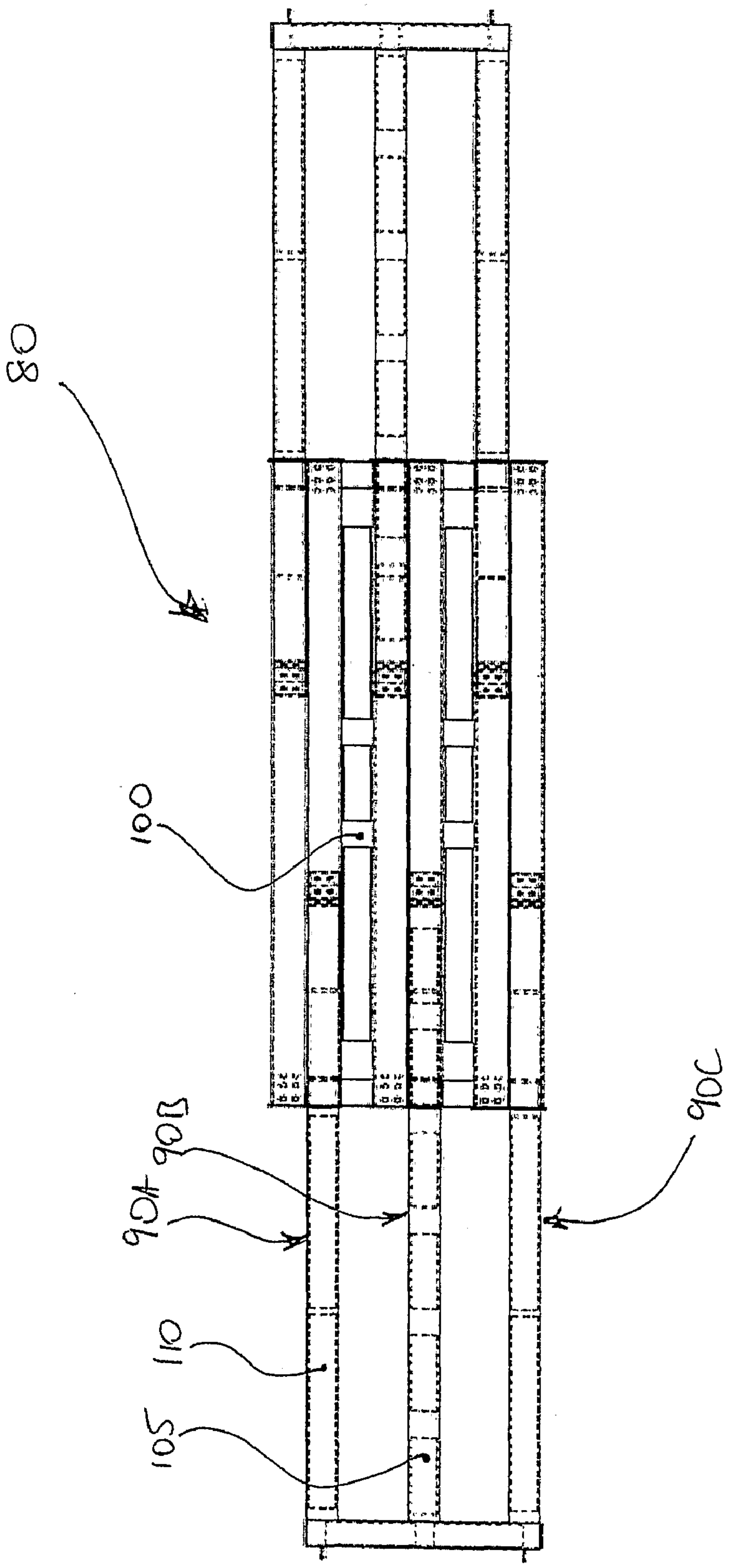
FIG. 6 is a plan view of the frame shown in FIG. 5.

FIGS. 5 and 6 show a further embodiment of the frame 80 whereby, for both added strength and wider distribution of detection units, the frame 80 incorporates three parallel arms within each extendible group 85A, B. As with the previous embodiment, a central platform 100 houses a number of detection units. Further, as seen in FIG. 6, the internal placement of detection units within the arms increases the number of detection units. Further still, it increases the distribution of detection units along the frame length and consequently for the full length of the container, given the mounting of the frame 80 to the extreme ends of the spreader. This increased distribution has the benefit of creating a map of radiation emanating from the container from which a radiation signature for the container can be determined. Accordingly, and as compared to the prior art, the frame according to the present invention can more accurately map, and consequently formulate a signature of the container more accurately than having the detection units mounted directly to the spreader. Further the frame according to the present invention also increases the density of detection units by being able to place smaller detection units in a more even distribution throughout the length of the frame. As the size of the platform 100 within this embodiment is not limited, larger units can also be used should that be desired by the end user.

The claim defining the invention are as follows:

1. A frame for supporting a detection system whilst said frame is attached to a lifting device, said lifting device used for lifting freight, the frame comprising:
- attachment brackets for attaching the frame to the lifting device;
- at least one platform for mounting the detection system to the frame, such that the frame is in spaced relation to the freight whilst mounted to the lifting device; and
- wherein:
  - the frame is disengageable from the lifting device whilst the freight is mounted to the lifting device; and
  - the frame is selectively extendable so as to accommodate extension of the lifting device.

2. The frame according to claim 1, wherein the frame is adapted to fit wholly within a void defined by the lifting device and the freight.

3. The frame according to claim 1, further comprising a plurality of support brackets in spaced relation longitudinally along said frame.

4. The frame according to claim 1, wherein said frame is suspended from lifting device.

5. The frame according to claim 1, wherein said frame is mounted adjacent extreme opposed ends of lifting device.

6. The frame according to claim 1, wherein the frame spans the full length of the lifting device.

7. The frame according to claim 1, wherein the frame comprises parallel arms connected through at least one lateral connection member.

8. The frame according to claim 7, wherein the at least one lateral connection member includes at least one platform used to support at least a portion of the detection system.

9. The frame according to claim 8, wherein the frame comprises three lateral connection members, one of which is a platform for mounting detection system to.

10. The frame according to claim 7, wherein the arms comprise open channel sections, with open portion directed upwards.

11. The frame according to claim 10, wherein said open channels adapted to receive detection system.

12. The frame according to claim 1, wherein the selectively extendable frame includes telescopic arms.

13. The frame according to claim 1, wherein the selectively extendable frame includes nested arms.

14. The frame according to claim 1, wherein the selectively extendable frame includes arms having fixed and extendable portions, the extendable portions mounted at least one of adjacent and parallel to the corresponding fixed portions.

15. The frame according to claim 1, wherein the lifting device is a spreader for lifting containers.

16. The frame according to claim 1, wherein the lifting device is a spreader adapted to lift more than one container.

* * * * *